United States Patent [19]

Mukai et al.

[11] Patent Number: 4,552,445
[45] Date of Patent: Nov. 12, 1985

[54] FOCUS CONDITION DETECTING DEVICE FOR CAMERAS

[75] Inventors: Hiromu Mukai, Kawachinagano; Toshihiko Karasaki; Kunio Kawamura, both of Sakai, all of Japan

[73] Assignee: Minolta Camera Kabushiki Kaisha, Osaka, Japan

[21] Appl. No.: 640,771

[22] Filed: Aug. 14, 1984

[30] Foreign Application Priority Data

Aug. 16, 1983 [JP] Japan .............................. 58-149959

[51] Int. Cl.$^4$ ....................... G03B 3/00; G01J 1/36
[52] U.S. Cl. ................................. 354/406; 250/204
[58] Field of Search ................... 354/406, 407, 408; 250/204

[56] References Cited

U.S. PATENT DOCUMENTS

| | | | |
|---|---|---|---|
| 3,875,401 | 4/1975 | Stauffer | 250/201 |
| 4,384,210 | 5/1983 | Stauffer | 250/550 |
| 4,436,395 | 3/1984 | Fukuhara | 354/406 |

FOREIGN PATENT DOCUMENTS

| | | |
|---|---|---|
| 52-95221 | 8/1977 | Japan . |
| 55-157220 | 11/1980 | Japan . |
| 58-88709 | 5/1983 | Japan . |
| 58-106511 | 6/1983 | Japan . |

Primary Examiner—William B. Perkey
Attorney, Agent, or Firm—Joseph W. Price

[57] ABSTRACT

In a focus condition detecting device of the type in which a pair of re-imaging lenses together with a condenser lens form a pair of re-images of an object image on a line sensor such that the distance between the corresponding points of the re-images on the line-sensor varies with the focus condition of a camera objective lens forming the objective image, the line sensor is located in front of a plane conjugate with a predetermined focal plane of the camera objective lens with respect to the condenser lens and the re-imaging lenses, so that the distance between the corresponding points of the first and second re-images on the line-sensor can be detected with resolution higher than one pitch length of the photocells of the line sensor.

3 Claims, 25 Drawing Figures

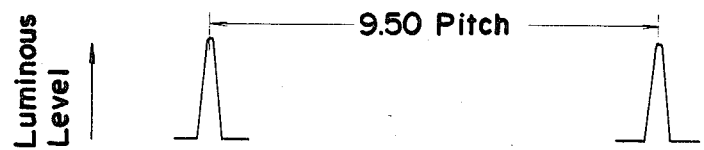
FIG.10a
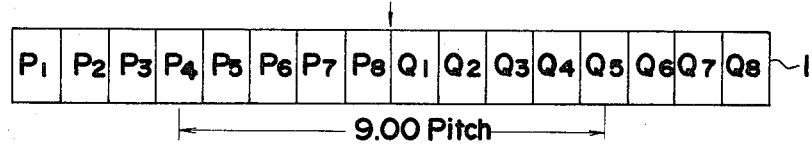
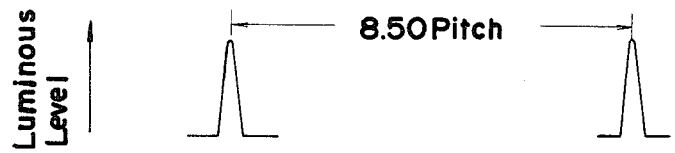
FIG.10b
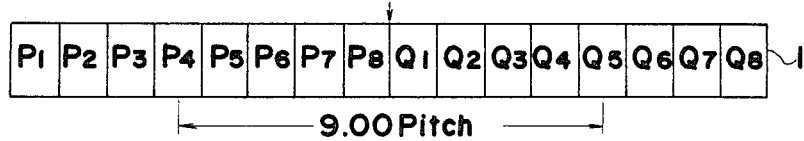
FIG.10c
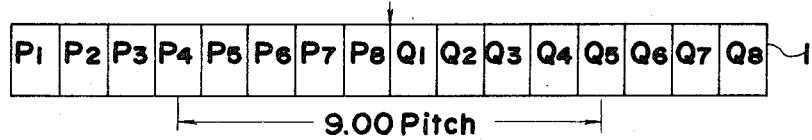
FIG.10d
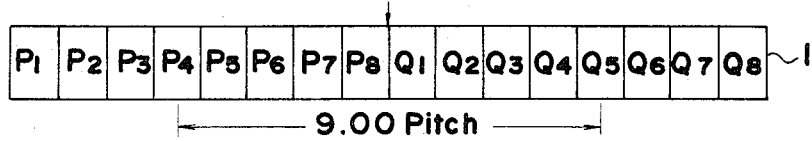

Distance between the Corresponding Image Points in Pitch

Distance between the Corresponding Image Points in Pitch

Distance between Corresponding Image Points in Pitch

Distance between Corresponding Image Points in Pitch

FOCUS CONDITION DETECTING DEVICE FOR CAMERAS

BACKGROUND OF THE INVENTION

1. Field of the Invention

The present invention relates to a focus condition detecting device for a camera which detects the focusing condition of the objective lens through measurment of the light rays coming from an object to be photographed (hereinafter referred to as object light rays) and having passed through the objective lens.

2. Description of the Prior Art

Many focus detecting devices have been proposed wherein object light rays having passed through first and second areas of the objective lens that are symmetric with each other with respect to the optical axis of the objective lens, are re-concentrated or re-converged by a pair of re-imaging lenses to form two images after once concentrated or converged by the objective lens, and the relative positions of the two images are detected to determine the amount and direction of defocus of the object image formed by the objective lens, or the amount and direction of deviation of the focused position of the object image from a predetermined focal plane (whether the object image is in front of or in the rear of the predetermined focal point, i.e. whether a front focus or a rear focus condition is attained). A typical optical system of such focus detecting devices has a construction as shown in FIG. 1. The optical system includes a condenser lens 6 disposed on or in the back of a predetermined focal plane 4 which in turn is to the rear of an objective lens 2. To the rear of the condenser lens 6 are disposed a pair of re-imaging or relay lenses 8 and 10. A pair of photocell arrays 12 and 14 which have CCDs as the light detectors, are disposed on the respective predetermined focal planes of the re-imaging lenses. The images formed by re-imaging lenses 8 and 10 on photocell arrays 12 and 14 are hereinafter referred to as re-images of the object image formed by the objective lens 2. The re-images are nearer or closer to the optical axis 18 and to each other as shown in FIG. 2 when the object image is formed in front of the predetermined focal plane i.e. in the case of front focus. In contrast, the re-images are distant from the optical axis 18 in the case of rear focus. When the objective lens 2 is in in-focus condition, the distance between two corresponding points of the two re-images has a given value determined by the construction of the optical system of the focus detecting device. Accordingly, the focus condition can be basically determined by detecting the distance of the two re-images based on the outputs of the photocell arrays. The outputs of the photocell arrays are correlated through the correlator 16 to provide the defocus signal. The fpllowing method has been known as one of the method for detecting the distance between the two re-images.

With reference to FIG. 3, photocell arrays 12 and 14 are respectively composed of ten and sixteen photodiode cells 21, a1 to a10 and b1 to b16. Assume for the convenience that the reference characters assigned to each cell also represents the output level of the cell. If consecutive ten cells are to be taken from the photocell array 14, seven sets B1, B2 . . . B7 can be made. The focus condition can be detected by determining on which one of the seven sets is formed the re-image that best coincides with the re-image on the photocell array 12. For example, if the re-image on the set B1 of the array 14 best coincides with the re-image on the array 12, that is, if the relationship of a1=b1, a2=b2 . . . a10=b10 is found between outputs of corresponding cells of the two sets a1 to a10 and b1 to b10, the total sum S1 of the absolute values of the differences between outputs of corresponding cells will be the critically as follows:

$$S1 = |a1-b1| + |a2-b2| + \ldots |a10-b10| \ldots = 0 \quad (1)$$

Thus, the values S1 is smaller than any other values calculated in the same way for the sets other than B1. In other words, the value of S1 is the smallest of the sums of the absolute values of the differences calculated in the same way for all the sets. To find the minimum value, the calculations as given by the formula (1) is made for all the sets and the sums obtained from the calculations are compared with one another. If it is detected the re-image on the set B1 best coincides with the re-image on the set A1, then it is determined whether the set B1 is at a predetermined standard position, nearer or closer to the optical axis than the standard position or more distant than the same, as well as what is the amount of deviation of the set B1 from the standard position. From the result, it is determined whether the objective lens is in the in-focus, front focus or rear focus condition and also the amount and direction of driving required for the objective lens to be brought into the in-focus condition is calculated.

With the above focus condition detecting device, the focus condition is detected based on discrete image signals from the photocell arrays, and hence there is a possibility of a focus detecting error produced dependent on the nature of the re-images. Take an object which is a single point source of light for example. Designated in FIG. 4 at I1, I2 are illuminance distributions of re-images of the light spot which are formed on a line sensor 1 by the condenser lens 6 and re-imaging lenses 8, 10. The line sensor 1 corresponds to photocell arrays 12, 14 in FIG. 1. An interval between adjacent two of graduations on the horizontal axis corresponds to one cell. Since the re-images are images of the point source of light, the range of the illuminance distributions of the re-images fall in one cell of the line sensor, respectively. The focus condition is determined by a distance k between the two re-images I1, I2 on the line sensor. If each of the re-images I1, I2 is moved laterally in one cell, the output from that cell remains unchanged. For example, the line sensor output remains the same at a time when the re-images are positioned at I1, I2 and at a time when they are positioned at inward locations I1', I2' in which the distance k' between the re-images is about two cells shorter than the distance k between the re-images I1, I2. Accordingly, such a distance difference cannot be detected resulting in a focus detection error. The focus detection error is produced not only with an object which is a point light source, but also with an object having a step-like luminance distribution.

In avoiding the above focus detection error, it would be effective to cutting off higher-frequency components from spatial frequency components of the re-images on the line sensor so that the illuminance distribution of the re-images of the light spot would extend over a plurality of cells. However, the focus detecting optical system would be complex in construction since it would require an optical element having the characteristics of a low-pass filter.

SUMMARY OF THE INVENTION

It is accordingly an object of the present invention to provide a focus condition detecting device of the above mentioned type enabling more accurate focus condition by a simple arrangement which can detect the distance between re-images on a line sensor with higher resolution.

With a focus condition detecting device of the present invention, a line sensor is located in front of a plane conjugate with a predetermined focal plane of a camera objective lens with respect to a condenser lens and a pair of re-imaging lenses. In other words, as the contrasts of the re-images become maximum on the above plane where a focused object image as the original of the re-images is formed, the line sensor is located in front of a maximum contrast position in that case.

This feature of the present invention and its advantages will become more apparent from the following description with reference to the accompanying drawings.

BRIEF DESCRIPTION OF THE DRAWINGS

FIGS. 10a, 10b, 10c and 10d are graphs showing illuminance distributions on the line sensor 1 where re-images of a point image is formed on the line sensor, wherein FIGS. 10a and 10b show the cases where the distance between the re-images is 9.50 pitches and 8.50 pitches, respectively, with the line sensor located at the position B in FIG. 5 and FIGS. 10c and 10d show the cases where the distance between the re-images is 9.50 pitches and 8.50 pitches, respectively, with the line sensor located at the position C in FIG. 5, FIGS. 11a and graphs showing the outputs of the line sensor, wherein FIG. 11a corresponds to the case of FIG. 10c and 11b corresponds to the ease of FIG. 10d, FIGS. 12a, 12b and 12c are graphs showing the outputs of the line sensor of FIG. 11a in an overlapped manner, wherein the outputs of photocells P3, P4, P5 are overlapped with those of photocells Q3, Q4, Q5 resepectively in FIG. 12a, with those of photocells Q4, Q5, Q6 respectively in FIG. 12b, and with those of photocells Q5, Q6, Q7 respectively in FIG. 12c.

DESCRIPTION OF A PREFERRED EMBODIMENT

In advance to the explanation of a preferred embodiment of the present invention, the idea of the present invention will now be explained with reference to FIG. 5.

According to the present invention, a line sensor is located in front of a plane conjugate with a predetermined focal plane of an objective lens with respect to a condenser lens and a pair of re-imaging lenses, as described earlier.

With the arrangement of the line sensor, re-images formed by the condenser lens and the re-imaging lenses are defocused when an object image formed by the objective lens as the original of the re-images is focused on the predetermined focal plane of the objective lens, resulting in an effect which would be achieved by a low pass filter. The same efffect could also be gained by locating the line sensor behind the plane conjugate with the predetermined focal plane of the objective lens with respect to the condenser lens and the re-imaging lenses. However, such an alternative arrangement would not be preferred since the re-images would be subjected to large comma.

Figure 2:
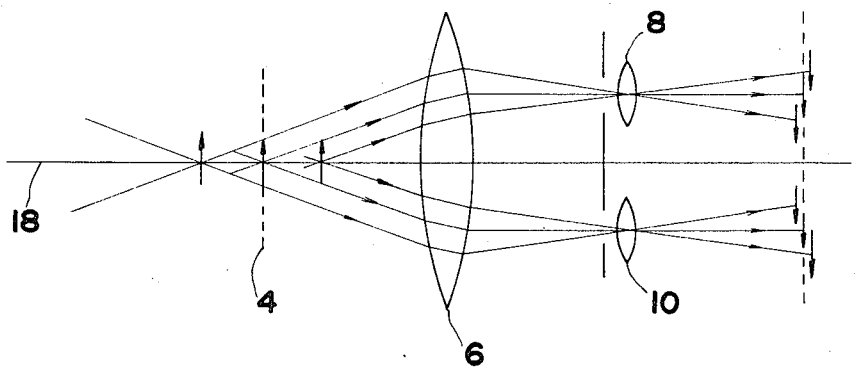
FIG. 2 is an enlarged schematic illustration of a part of the optical system shown in FIG. 1, showing how the re-images of front focus, in-focus and rear focus object images are formed.
Figure 5:
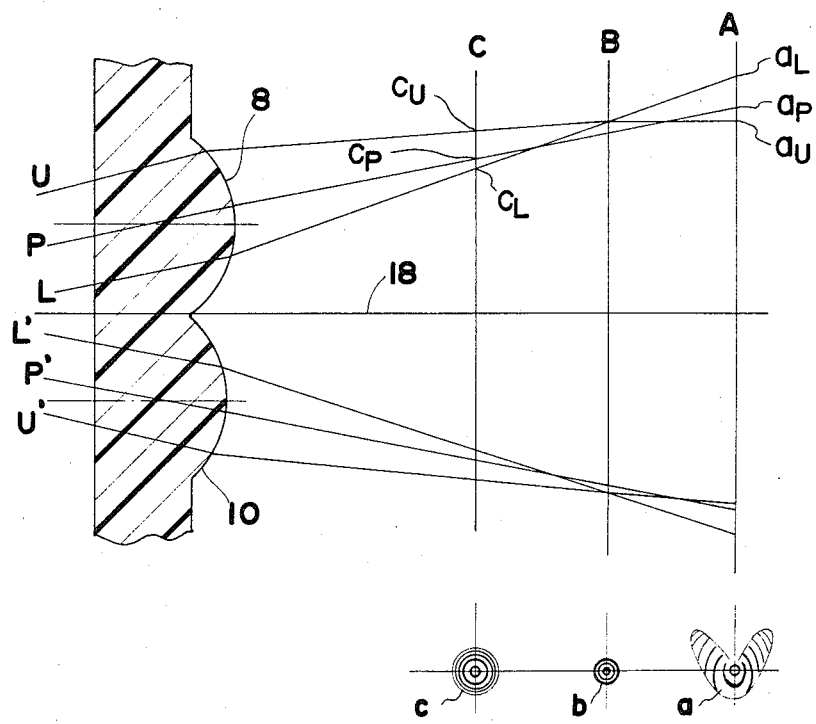
FIG. 5 is an explanatory illustration of light rays passing through re-imaging lenses 8, 10 and illuminance distributions a, b, c of the re-images formed by the light rays on planes at positions A, B and C, the light rays being emitted from a point or spot image focused on the predetermined focal plane of a not shown objective lens at a position on the optical axis 18 of the objective lens.

In FIG. 5, designated at U, P, L and U', P', L' are light rays emitted from a point or spot image formed by a not shown objective lens to focus on a predetermined focal plane of the objective lens at a position on the optical axis 18 of the objective lens. The light ray P passes through the center of the re-imaging lens 8 and the light ray P' passes through the center of the re-imaging lens 10. Since the centers of the re-imaging lenses 8, 10 are positioned laterally of the optical axis 18, the light rays P, P' pass obliquely through the centers of the lenses 8,10, respectively. Thus, the re-images of the point or spot image which are formed by the lenses 8, 10 are subjected to coma since the spot image is positioned laterally of the optical axes of the lenses 8, 10. However, at a position B which is conjugate with the predetermined focal plane of the objective lens with respect to the re-imaging lenses 8, 10 and condenser lens 6, little coma is generated and each of the re-images has a illuminance distribution as shown in FIG. 5 at b, which is included in a minimum circle of confusion of light. Thus, the image contrast is maximum and the width or diameter of each of the re-images is much smaller than the one cell of the line sensor. In constrast at a position A behind the position B, the points $A_U$ and $A_L$ through which the light rays U and L pass deviate from the point $A_P$ through which the light ray P passes and the deviation of point $A_U$ from the point $A_P$ is much larger than the deviation of the point $A_L$ from the point $A_P$. Thus, large coma is generated and each of the re-images at this position A has an illuminance distribution as shown in FIG. 5 at a, which is not concentric about the point $A_P$ and spreads outwardly from the optical axes of the lenses 8, 10. According to the pinciple of the focus condition detection on which the present invention is based, the re-imaging lenses 8, 10 form two re-images of an object image with the re-images oriented in the same direction as indicated by arrows in FIG. 2 and based on such a premise the correlation between the two re-images is detected. Since the two re-images at the position A have the illuminance distribution a respectively and their spreading directions are opposite to one another, they are determined as different images when detected by the line sensor though they are in fact re-images of the same object image, so that the correlation between them becomes hard to be exactly detected.

At a position C in front of the position B, although the points $C_U$ and $C_L$ through which the light rays U and L pass deviate from the point $C_P$ through which the light ray P passes, the deviations of the points $C_U$ and $C_L$ from the point $C_P$ are relatively small and substantially symmetrical with respect to the point $C_P$. Thus, the re-images at the position C respectively have an illuminance distribution as shown in FIG. 5 at c, which is substantially concentric about the point $C_P$. In other words, the re-images at the position C are less affected by coma than the re-images at the position A and have less orientation which would make the exact detection of the correlation between the re-images difficult. Meanwhile, the illuminance distributions of the re-images extend over a plurality of cells of a line sensor, respectively, when the line sensor is located at the position C. This is the reason why the line sensor is positioned in front of the maximum contrast position according to the present invention.

Figure 3:
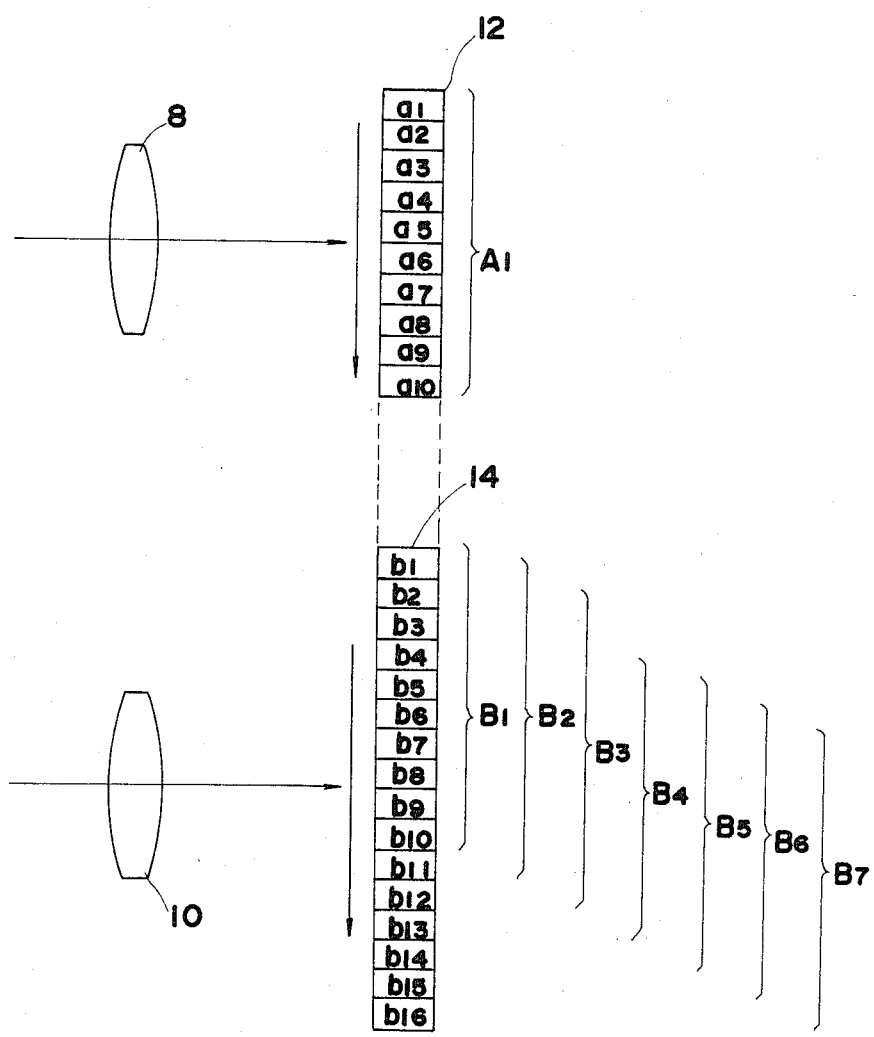
FIG. 3 is an explanatory illustration of photocell arrays 12, 14 and re-imaging lenses 8, 10, explaining a known focus detecting method.
Figure 4:
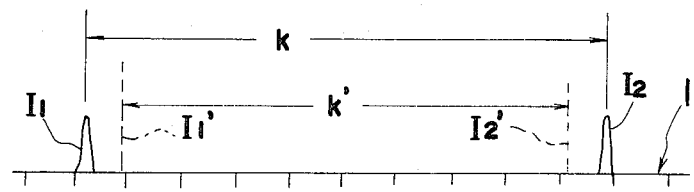
FIG. 4 is a graph showing illuminance distributions on a line sensor 1 where re-images of a point image is formed on the line sensor.

The reason why the focus detection error described above with reference to FIG. 4 is prevented according to the present invention will be described hereinbelow. It is assumed in FIG. 3 that the correlation between the sets A1 and B4 is greatest when the objective lens is in an in-focus position. If the correlation between the sets A1 and B1 is highest with the objective lens being located at an out-of focus position, then a direction and an extent of driving the objective lens until the correlation between the sets A1 and B4 becomes greatest are determined dependent on the direction and extent of the deviation of the set B1 from the set B4. By driving the picture-taking lens based on the determined direction and extent, the correlation between the sets A1 and B4 becomes greatest. This condition merely means that the correlation between the sets A1 and B4 is greatest among the correlations between the other possible sets, and thus the focus detection still suffers from an error the amount of which is at maximum such a value corresponding to a positional variation of the objective lens causing a variation in the distance between the two re-images commensurate with two cells where the object is a point source of light as described with reference to FIG. 4 or has step-like contrast pattern.

According to the present invention, the re-images of a point or spot image extend over a plurality of cells, respectively, as described above, and the correct positions of the re-images can be assumed by outputs from the plural cells. Although the outputs are of discrete values from the individual cells, the positions of the re-images in one cell interval or pitch can be determined if re-images are distributed over a plurality of cells, respectively. When comparing the sets A1 and B1, therefore, the correlation between the re-images on the sets A1 and B1 can be ascertained with an accuracy higher than that for one cell pitch.

Figure 11A:
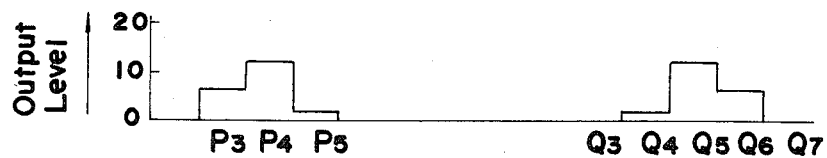
Figure 11B:
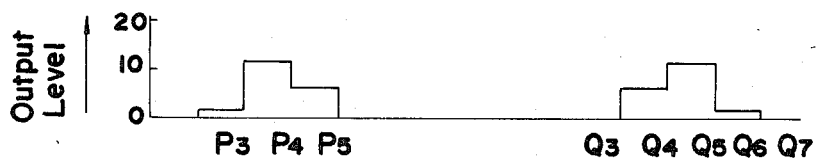

Advantages of the present invention will be described with reference to FIGS. 10a to 10d, 11a to 11b. In FIGS. 10a to 10d, a line sensor 1 is composed of photocells P1–P8, and Q1–Q8. From an object which is a point source of light, two re-images having illuminance distributions as shown in FIGS. 10a and 10b are formed on line sensor 1 depending on the focus condition of the objective lens. In each of FIGS. 10a and 10b, the re-images are formed only on the photocells P4, Q5, respectively. Using a photocell-to-photocell interval or pitch for a unit, the distance between the two re-images in FIG. 10a corresponds to 9.50 pitches, and the distance between the two images in FIG. 10b 8.50 pitches. In FIGS. 10a and 10b, however, the line sensor produces outputs only from the photocells P4, Q5, and the output signals indicate that the distance between the re-images is 9.00 pitches in both cases. Accordingly, the distance between the re-images cannot be detected with a resolution higher than the pitch. FIGS. 10c and 10d show illuminance distributions in which re-images are spaced 9.50 and 8.50 pitches and each extend over three successive photocells. The photocells on which the re-images of FIGS. 10c and 10d are formed produce output signals as illustrated in FIGS. 11a and 11b, respectively. These output signals indicate that the distance between the re-images can be detected with a resolution higher than one pitch.

Figure 12A:
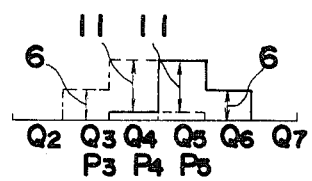
Figure 12B:
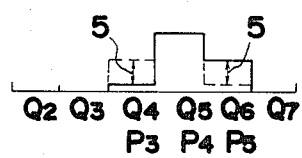
Figure 12C:
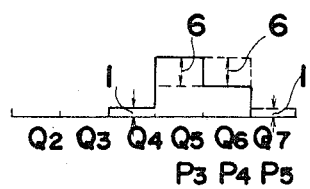

FIGS. 12a, 12b and 12c show comparison between outputs corresponding to two re-images of a spot image. FIG. 12a illustrates outputs from the photocells P3, P4, P5 and outputs from the photocells Q3, Q4, Q5, which are illustrated in overlapping relation with the photocells P3, P4, P5, the numerals representing the differences between the outputs from corresponding photocells. The degree of coincidence between the two re-images can be detected by taking the sum S of the absolute values of the differences between the outputs from two corresponding photocells. The degree of coincidence is greater as the sum S of the absolute values of the output differences is smaller. If the sum S is zero, then the two re-images are in complete coincidence. Assuming that the sum S in the case of FIG. 12a is given as S8, $$S8 = |Q3 - P3| + |Q4 - P4| + |Q5 - P5| + |Q5 - P5|$$
$$= 6 + 11 + 11 + 6$$
$$= 34$$

FIG. 12b shows outputs from the photocells P3, P4, P5 and outputs from the photocells Q4, Q5, Q6 which are shifted from the photocells Q3, Q4, Q5 by one pitch, respectively. In this case the sum S is as follows:

$$S9 = |Q4 - P3| + |Q5 - P4| + |Q6 - P5|$$
$$= 5 + 0 + 5$$
$$= 10$$

FIG. 12c shows outputs from the photocells P3, P4, P5 and outputs from the photocells Q5, Q6, Q7 which are shifted from the photocells Q5, Q6, Q7 which are shifted from the photocells Q3, Q4, Q5 by two pitches, respectively. In this case, the sum S is as follows:

$$S10 = |Q4 - P2| + |Q5 - P3| + |Q6 - P4| + |Q7 - P5|$$
$$= 1 + 6 + 6 + 1$$
$$= 14$$

Figure 13:
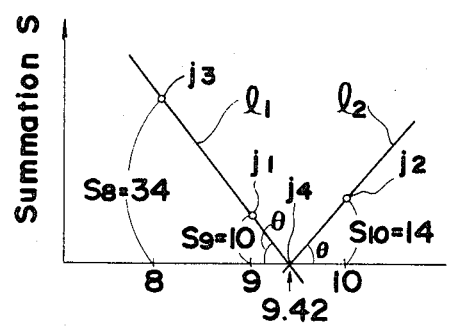
FIG. 13 is a graph showing how the distance between the re-images is determined with resolution higher than one pitch length in the case of FIG. 10c, FIGS. 14a 14b and 14c graphs showing the outputs of the line sensor of FIG. 11b in an overlapped manner, wherein the outputs of photocells P3, P4, P5 are overlapped with those of photocells Q3, Q4, Q5 respectively in FIG. 14a, with those of photocells Q4, Q5, Q6 respectively in FIG. 14b and with those of photocells Q5, Q6, Q7 respectively in FIG. 14c.
Figure 14A:
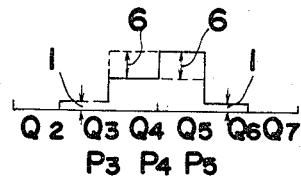
Figure 14B:
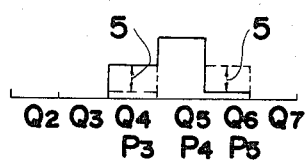
Figure 14C:
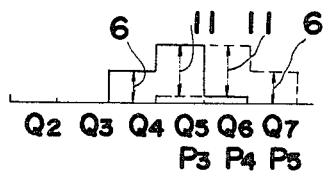
Figure 15:
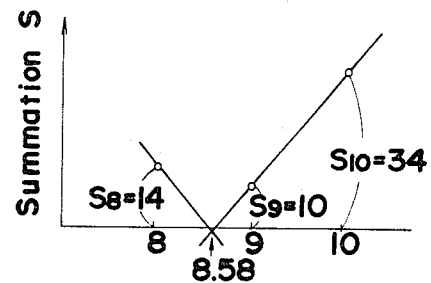
FIG. 15 is a graph showing how the distance between the re-images is determined with resolution higher than one pitch length in the case of FIG. 10d, and FIGS. 16 and 17 are graphs showing the manners of determining the distance between the re-images in more general fashion.

It follows from the foregoing that S9 is the smallest and S10 is the second smallest. FIG. 13 is a graph showing the results of the image comparison, the horizontal axis indicating the distance as pitches between two photocells (such as P3, Q3 for example) which are made correspondent to one another in the image comparison as shown in FIG. 12a. In FIG. 13, a straight line l1 is drawn which extends at an angle $\theta$ to the horizontal axis and passes through points j1, j3 indicative of the smallest sum S9 and the third smallest sum S8, and then a straight line l2 is drawn which extends at the angle $\theta$ but is inclined in an opposite relation, and passes through a point j2 indicative of the sum S10. The point of intersection j4 of the straight lines l1, l2 as it is on the horizontal axis is regarded as a distance between the two re-images. FIG. 13 indicates that the point of intersection j4 is positioned at 9.42. FIG. 13 corresponds to the image position shown in FIG. 10c. Since the image interval is actually 9.50 in FIG. 10c, the value 9.42 thus determined contains a small error but clearly shows a higher resolution. FIGS. 14a, 14b, 14c and 15 are similar to FIGS. 12a, 12b, 12c and 13, respectively. FIG. 15 shows the image position illustrated in FIG. 10d. In FIG. 15, the value 8.58 can be read against the actual image interval of 8.50. It can be understood that the resolution is improved since only information of 9 pitches is available with the image of FIG. 10b.

Figure 16:
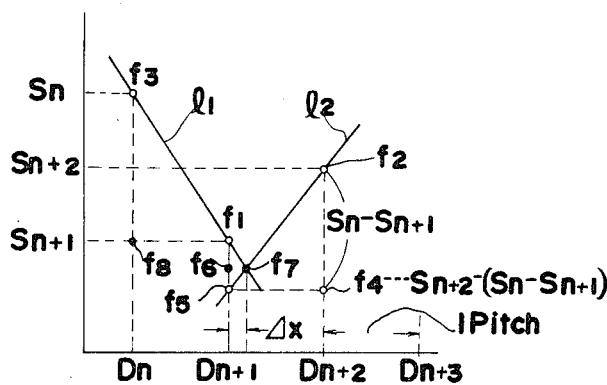

Determination through calculations of the coordinate on the horizontal axis of the intersecting point of the two straight lines in FIGS. 13 and 15 will be described with reference to FIG. 16. In FIG. 16, points f1, f2, f3 correspond respectively to the points j1, j2, j3 in FIG. 13. To draw the straight line l2 which has the same slope as that of the straight line l1 passing through the points f1, f3, has an opposite sign of slope, and passes the point f2, a point f4 which is Sn−Sn+1 lower than the point f2 is taken, a point f5 which has the same height as that of the point f4 is taken on an image interval graduation Dn=1, and a straight line is drawn through the points f2, f5. The straight lines l1 and l2 intersect at a point f7, a straight line is drawn from the point f7 parallel to the horizontal axis toward a line segment f1f5, the drawn straight line intersecting the line segment at a point f6. A length $\Delta x$ between the points f6, f7 now serves to indicate information on an image interval below one pitch. Since a triangle f1f6f7 is similar to a triangle f1f3f8, $$\Delta x : f1f6 = f1f8 : f3f8 \quad (2) \text{ where}$$

$$f1f6 = (\tfrac{1}{2})f1f5 \quad (3)$$
$$= (\tfrac{1}{2})\{Sn + 1 - (Sn + 2 - Sn + 1)\}$$

-continued
$$= (\tfrac{1}{2})(Sn - Sn + 2)$$

$$f3f8 = Sn - Sn + 1 \quad (4)$$

f1f8 is a length corresponding to one pitch of the line sensor. Therefore, $$\Delta x = \tfrac{1}{2} \times \frac{Sn - Sn + 2}{Sn - Sn - 1} \times \text{(one pitch length)} \quad (5)$$

By substituting the numerical values in FIG. 13 for Sn, Sn+1 and Sn+2 in the equation (5), $\Delta x$ is found to be 0.417. In FIG. 16, an image interval to be determined is equal to the image interval Dn+1 corresponding to the smallest sum Sn+1 plus $\Delta x$.

According to the foregoing example, the sum S next smaller than the smallest sum S is positioned rightward of the graduation Dn+1 in the graph. For the next smaller sum S positioned leftward of Dn+1 as shown in FIG. 17, the following equation can be derived in the same manner as described above.

$$\Delta x = \tfrac{1}{2} \times \frac{Sn + 2 - Sn}{Sn + 2 - Sn + 1} \times \text{(one pitch length)} \quad (6)$$

Figure 17:
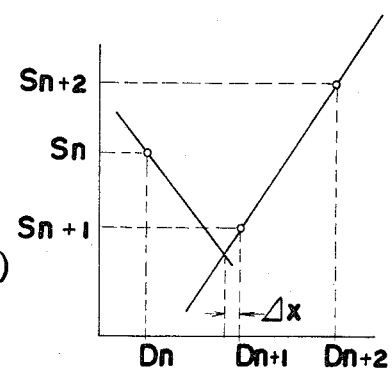

In FIG. 17, an image interval to be determined is equal to the image interval Dn+1 corresponding to the smallest sum Sn+1 minus $\Delta x$.

As described above, an image interval can be detected at a resolution smaller than one pitch through a calculation given data on three sums S.

Figure 1:
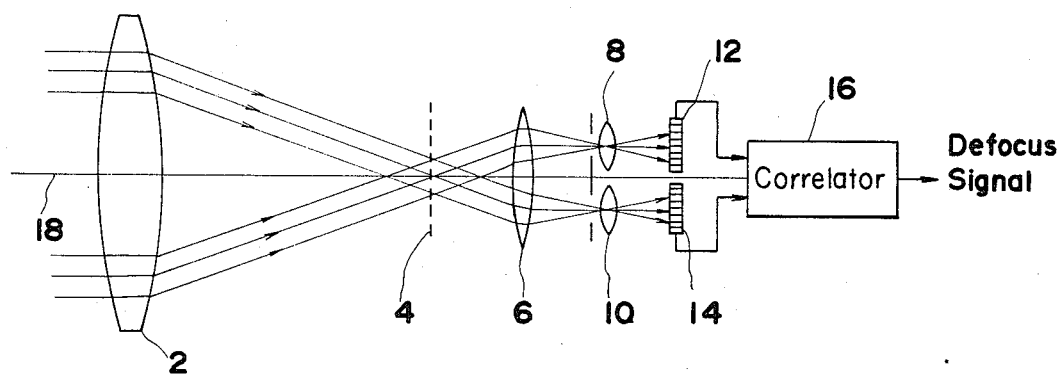
FIG. 1 is a schematic illustration of a typical optical system of known focus condition detecting devices of the type relating to the present invention.
Figure 6:
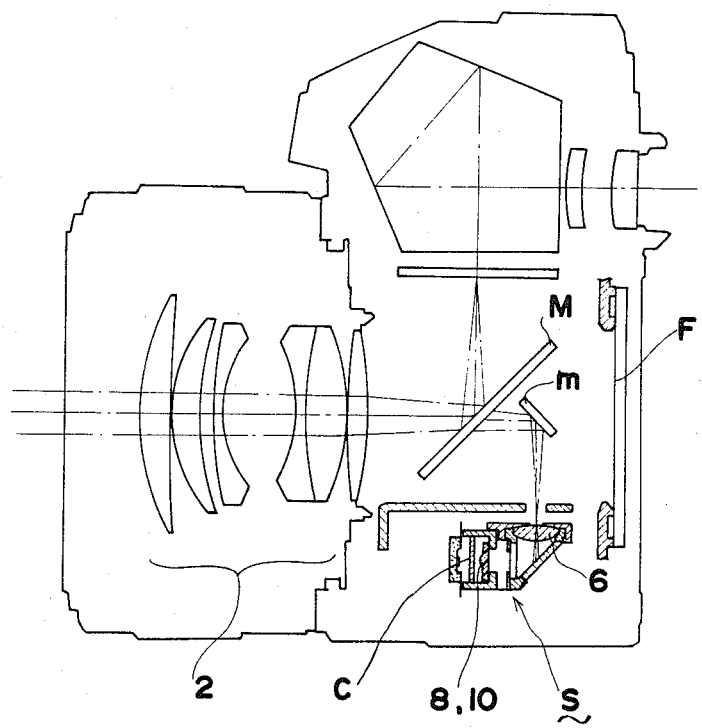
FIG. 6 is a schematic illustration of the overall optical system of a single lens reflex camera to which a focus condition detecting device according to a preferred embodiment of the present invention is employed as a unit module.
Figure 7:
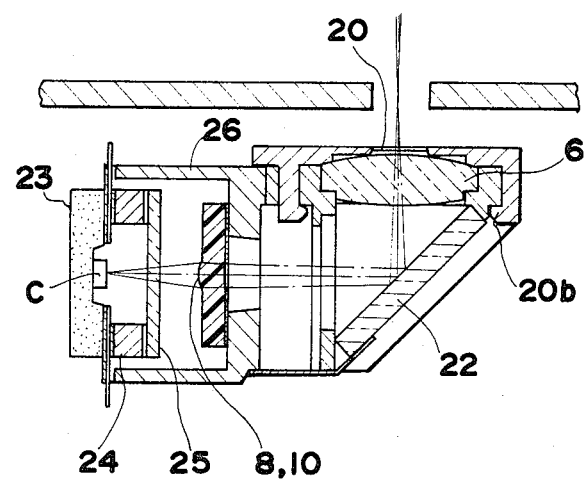
FIG. 7 is a vertical cross-sectional view of the module.
Figure 8:
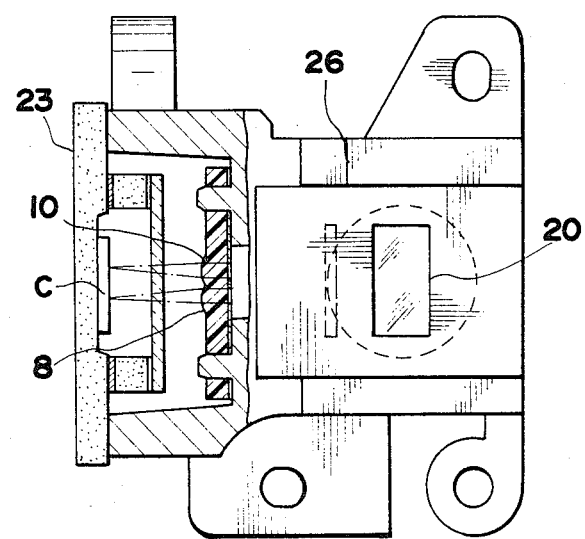
FIG. 8 is a plan view of the module partially in section.

FIG. 6 shows a single-lens reflex camera incorporating therein a focus condition detecting device according to a preferred embodiment of the present invention. Designated at 2 is an objective lens, M a single-lens reflex mirror, m a smaller mirror movable with the mirror M for deflecting an optical axis of the objective lens downwardly, and S the focus condition detecting device of the present invention. The device S is constructed as a unit module and disposed below the bottom of a mirror box of the camera. Light having passed through the objective lens passes through a light transmission portion of the mirror M and is reflected by the mirror m to enter the focus condition detecting device S. Corresponding parts in the focus condition detecting device S are denoted by corresponding reference numerals in FIG. 1. Denoted by 6 is a condenser lens, 8, 10 re-imaging lenses (only the lens 8 is seen in FIG. 6 as they are arranged in a direction normal to the sheet of FIG. 6), and 1 a CCD line sensor located in the position C as shown in FIG. 5. FIG. 7 is an enlarged vertical cross-sectional view of the focus condition detecting device S, and FIG. 8 is a plan view, partly in cross section, of the optical system S. In FIG. 7, the reference numeral 22 indicates a mirror for deflecting an optical axis of the condenser lens 6 through 90°, the mirror 22 rendering the overall device S compact in size. The reference numeral 20 indicates a field aperture mask disposed in front of the condenser lens 6 and having a rectangular opening as shown in FIG. 8.

Figure 9:
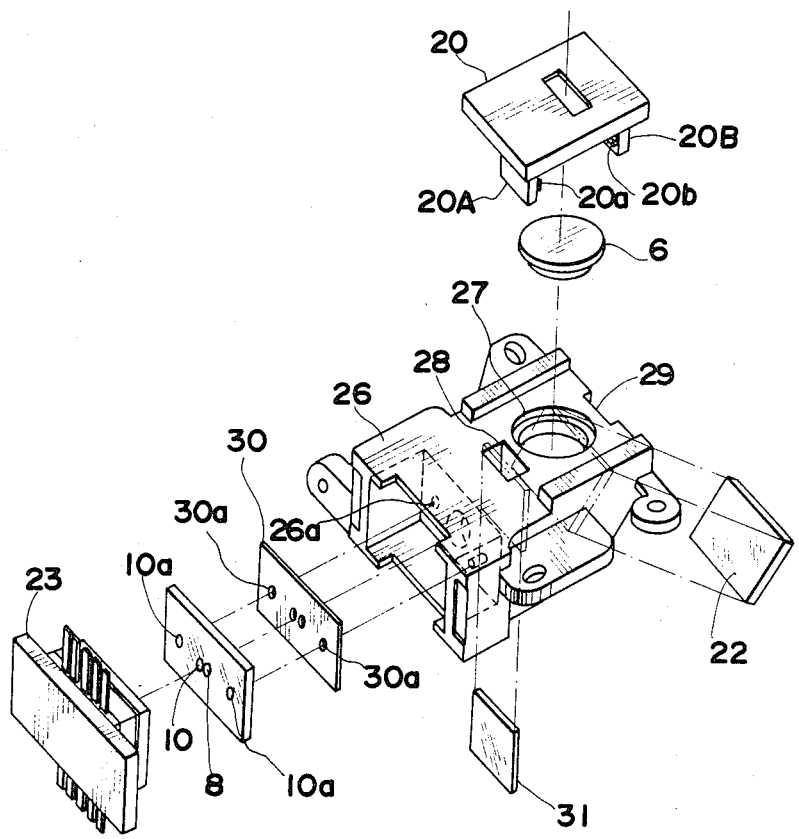
FIG. 9 is an exploded perspective view of the module.

FIG. 9 is an exploded perspective view of the focus condition detecting device S. The condenser lens 6 is fitted in a stepped circular hole 27 defined in an upper wall of a module body 26 so that the condenser lens 6 is positioned with respect to the module body 26. The field aperture mask 20 is positioned in place by engagement arms 20A, 20B thereof fitted in a rectangular hole 18 and a slot 29, respectively, defined in the module body 26. The engagement arms 20A, 20B have locking fingers 20a, 20b engaging the module body 26 to prevent the field aperture mask 20 from being detached from the module body 26, the field aperture mask 20 serving as a holder for the condenser lens 6. The re-imaging lenses 8, 10 are integrally molded of transparent plastics, and positioned together with a diaphragm aperture mask 30 therefor by pins 26a projecting in the module body 26 and fitted in holes 10a, 30a in the re-imaging lenses 8, 10 and the diaphragm aperture mask 30. Designated at 31 is an infrared-radiation cutoff filter.

What is claimed is:

1. A focus condition detecting device for a camera having an objective lens which forms an object image, said device comprising:
   a pair of re-imaging optical systems arranged symmetrically with one another with respect to the optical axis of said objective lens for re-imaging said object image as first and second re-images; and
   a line sensor arranged optically in front of a plane conjugate with a predetermined focal plane of said objective lens with respect to said re-imaging optical systems and extending in the direction perpendicular to the optical axis of said objective lens so that said first and second re-images are formed thereon, the distance between the corresponding points of said first and second re-images on said line sensor varying with the focus condition of said objective lens.

2. A focus condition detecting device as defined in claim 1, wherein one of said re-imaging optical systems includes a condenser lens having a center aligned with the optical axis of said objective lens and a first re-imaging lens having a center located laterally of the optical axis of said objective lens and the other of said re-imaging optical system includes said condenser lens and a second re-imaging lens arranged symmetrically with said first re-imaging lens with respect to the optical axis of said objective lens.

3. A focus condition device as defined in claim 2, wherein said device is formed into a unit module attachable to said camera.

* * * * *